Figure 1:
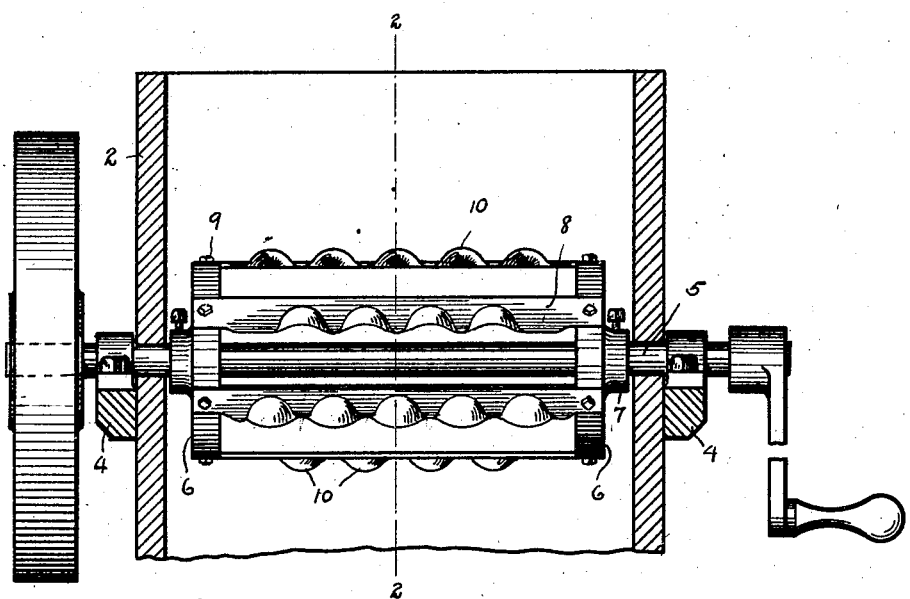

Nov. 5, 1929.  R. A. KATZELE ET AL  1,734,131
VEGETABLE CUTTER
Filed July 26, 1926

Inventors
M. C. CHRISTENSEN.
RUDOLPH A. KATZELE.
By Geo. Stevens.
Attorney

Patented Nov. 5, 1929

1,734,131

UNITED STATES PATENT OFFICE

RUDOLPH A. KATZELE AND MARTIN C. CHRISTENSEN, OF BARNUM, MINNESOTA

VEGETABLE CUTTER

Application filed July 26, 1926. Serial No. 125,086.

This invention relates to vegetable cutters, and has special reference to such a machine designed for cutting stock feed, the principal object being to provide such a device of simple construction and one capable of maximum capacity with the minimum of power.

Another object is to provide such a machine the use of which will result in a novel form of finished product, the same being capable of more uniformly meshing with other ground stock food, such as bran, meal, or the like, and being of better form for mastication by the animal.

Other objects and advantages of the invention will appear in the further description thereof.

Referring now to the accompanying drawing forming part of this application and wherein like reference characters indicate like parts.

Figure 2:
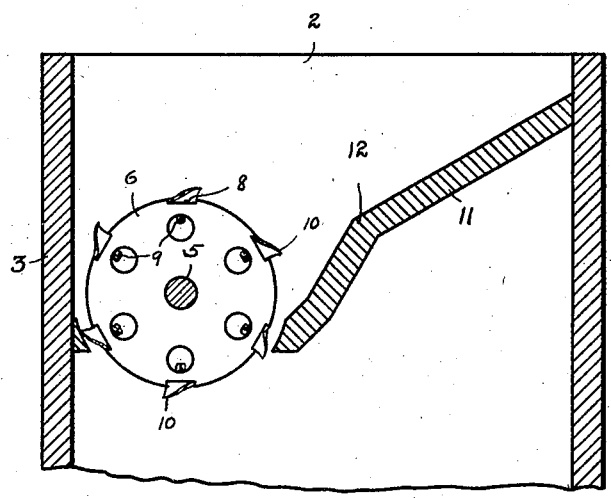

Figure 1 is a side elevation of my improved form of cutter showing the support therefor in section; and Figure 2 is a section on the line 2—2, Figure 1.

1 and 2 represent the side walls of the box-like structure which may be of wood or metal as desired, in which the cutter is mounted. Adjacent the front wall 3 of the receptacle and upon either side thereof are fixed in any desired manner suitable bearings for the shaft 5. This shaft extends transverse the box and carries the cylindrically shaped cutters thereupon in such a manner that the cutter blades just clear the inner face of the front wall 3. The cutter comprises the two disc like heads 6 which have hub-like extensions 7 thereupon for fixed attachment to the shaft 5. These discs are spaced apart one adjacent each side wall of the receptacle and have bolted to the peripheral edges thereof the long thin cutting blades 8, the ends of which I prefer to have rest in notches formed in the peripheral edges of the discs 6, they being held therein by suitable bolts as indicated at 9.

The principal novel feature of the device resides in the scalloped shape of the cutting edges of the knives 8, their backs being straight and rigid, while their cutting edges are provided with a plurality of outwardly extending scallops or semi-circularly shaped spaced cutting lips 10 they extending preferably only outwardly therefrom and being for the purpose of gouging from the individual vegetables being fed through the machine small conveniently edible pieces particularly adapted for the purpose described.

As convenient means for feeding the vegetables to the cutter I have shown an inclined partition wall 11 transverse the space between the back of the receptacle and the cutter and extending to a point slightly below the center thereof, said partition wall being somewhat humped as at 12 a short distance from the cutter so that any remaining vegetables will be more effectively fed thereto and not necessitate the dangerous forcing of same to the cutter by hand.

Having thus described our invention, what we claim and desire to secure by Letters Patent, is:

1. A vegetable cutter comprising in combination a shaft, spaced circular heads upon said shaft, circumferentially spaced cutting blades attached at either end to the heads, said blades having concave pressed out cutting edge portions spaced along the length thereof, the concave portions of one blade member being staggered in relation to those of an adjacent blade.

2. A vegetable cutter including a drum comprising circumferentially spaced cutting blades each having concaved pressed out edge portions spaced longitudinally the length thereof, said concaved portions of one blade being staggered in relation to those of an adjacent blade.

In testimony whereof we affix our signatures.

RUDOLPH A. KATZELE.
MARTIN C. CHRISTENSEN.